(12) United States Patent
Zhang et al.

(10) Patent No.: US 11,882,059 B2
(45) Date of Patent: Jan. 23, 2024

(54) METHOD FOR SELECTING PORT TO BE SWITCHED TO OPERATING STATE IN DUAL-HOMING ACCESS AND DEVICE

(71) Applicant: Huawei Technologies Co., Ltd., Shenzhen (CN)

(72) Inventors: Yaokun Zhang, Beijing (CN); Boran Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/731,927

(22) Filed: Apr. 28, 2022

(65) Prior Publication Data
US 2022/0255883 A1 Aug. 11, 2022

Related U.S. Application Data

(63) Continuation of application No. PCT/CN2020/117242, filed on Sep. 23, 2020.

(30) Foreign Application Priority Data

Oct. 29, 2019 (CN) .......................... 201911040135.X (51) Int. Cl.
*H04L 49/55* (2022.01)

(52) U.S. Cl.
CPC .................................... *H04L 49/55* (2013.01)

(58) Field of Classification Search
CPC . H04L 49/55; H04L 12/2863; H04L 41/0806; H04L 43/065; H04L 43/0817; H04L 45/22

See application file for complete search history.

(56) References Cited

U.S. PATENT DOCUMENTS

| 8,723,668 B1* | 5/2014 | Strohallen | A61G 15/02 433/101 |
| 2005/0066022 A1* | 3/2005 | Liebenow | H04L 12/12 709/223 |
| 2005/0076238 A1* | 4/2005 | Ormazabal | H04L 43/50 726/4 |

(Continued)

FOREIGN PATENT DOCUMENTS

| CN | 101826983 A | 9/2010 |
| CN | 102265555 A | 11/2011 |

(Continued)

OTHER PUBLICATIONS

P. Muley et al., "Pseudowire (PW) Redundancy," draft-ietf-pwe3-redundancy-02.txt, Oct. 26, 2009, 15 pages.

(Continued)

*Primary Examiner* — Christine Ng
(74) *Attorney, Agent, or Firm* — Conley Rose, P.C.

(57) ABSTRACT

A port selection method applied to a first network device and a second network device includes determining that a port status of a first port that is in the first network device and that is used for dual-homing access can switch from a first state to an UP state; receiving a port status of a second port that is in the second network device and that is used for dual-homing access; and selecting, based on the port status of the first port and the port status of the second port, a port to be switched to the UP state from the first port and the second port.

20 Claims, 6 Drawing Sheets

(56) References Cited

U.S. PATENT DOCUMENTS

| | | | |
|---|---|---|---|
| 2006/0002311 A1* | 1/2006 | Iwanaga | H04L 12/4675 370/254 |
| 2006/0034181 A1* | 2/2006 | Noguchi | H04L 1/22 370/242 |
| 2006/0155837 A1* | 7/2006 | Kobayashi | H04L 67/1097 709/223 |
| 2012/0033672 A1* | 2/2012 | Page | H04L 45/245 370/395.53 |
| 2012/0106360 A1 | 5/2012 | Sajassi et al. | |
| 2013/0262713 A1* | 10/2013 | Maeda | G06F 13/385 710/30 |
| 2013/0315255 A1 | 11/2013 | Mullooly et al. | |
| 2014/0211641 A1* | 7/2014 | Gohite | H04L 45/28 370/252 |
| 2016/0246344 A1* | 8/2016 | Slavin | G06F 1/28 |
| 2018/0091445 A1 | 3/2018 | Singh et al. | |
| 2020/0077333 A1* | 3/2020 | Kito | G01D 5/00 |
| 2020/0136912 A1 | 4/2020 | Song et al. | |

FOREIGN PATENT DOCUMENTS

| | | |
|---|---|---|
| CN | 103227725 A | 7/2013 |
| CN | 103441940 A | 12/2013 |
| CN | 108337162 A | 7/2018 |
| CN | 108574614 A | 9/2018 |
| CN | 108599984 A | 9/2018 |
| CN | 109150709 A | 1/2019 |
| EP | 3633931 A1 | 4/2020 |
| KR | 20110097180 A | 8/2011 |
| WO | 2017177644 A1 | 10/2017 |
| WO | 2019000952 A1 | 1/2019 |

OTHER PUBLICATIONS

Wu Shaoyong, et al., "Dual-homing Protection Technology of Carrier Ethernet Based on Distribution," Telecommunications Network Technology, 2010, Issue 04, 5 pages.

* cited by examiner

| Version | Type | VRRP Identifier | Length |
|---|---|---|---|
| Identifier 1 | Status 1 | Identifier 2 | Status 2 |
| Identifier 3 | Status 3 | Identifier 4 | Status 4 |
| ... | | | |

FIG. 4

| Version | Length | Identifier 1 | Status 1 |
|---|---|---|---|
| Identifier 2 | Status 2 | Identifier 3 | Status 3 |
| ... | | | |

METHOD FOR SELECTING PORT TO BE SWITCHED TO OPERATING STATE IN DUAL-HOMING ACCESS AND DEVICE

CROSS-REFERENCE TO RELATED APPLICATIONS

This application is a continuation of International Patent Application No. PCT/CN2020/117242, filed on Sep. 23, 2020, which claims priority to Chinese Patent Application No. 201911040135.X, filed on Oct. 29, 2019. The disclosures of the aforementioned applications are hereby incorporated by reference in their entireties.

TECHNICAL FIELD

This application relates to the communications field, and in particular, to a method for selecting a port to be switched to an operating state in a dual-homing access scenario, a network device, and a system.

BACKGROUND

Dual-homing access is a commonly used access reliability protection mechanism. In an example, an access side device is dual-homed to two network side devices. If one of the network side devices cannot be connected, the access side device can still connect to the other network side device. In this way, network transmission is not affected. When dual-homing access is used, a delay policy is usually deployed on the two network side devices, such as delayed operation of an access side port or delay negotiation of access side port trunk based on a Link Aggregation Control Protocol (LACP). The delay policy can prevent a system from being impacted by frequent intermittent disconnections of an access side link, or help to gain more recovery time when a network side device restarts. However, the delay policy presents a problem of overprotection. For example, when links of the two network side devices are intermittently disconnected at the same time and then quickly recover, the two network side devices implement the delay policy at the same time. In a time period during which the delay policy is implemented, network transmission is unnecessarily interrupted.

SUMMARY

This application provides a method, to resolve a technical problem of overprotection caused by a delay policy used in current dual-homing access.

According to a first aspect, this application provides a port selection method. The method is applied to a first network. The first network includes a first network device, a second network device, and an access side device. The access side device is dual-homed to the first network device and the second network device. The access side device communicates with a first port in the first network device. The access side device communicates with a second port in the second network device. The method includes that a first network device determines that a port status of the first port can switch from a first state to an UP state, where the first state is different from the UP state, and the UP state is a state in which a port can communicate with another network device. The first network device receives first information sent by the second network device, where the first information indicates that a port status of the second port is a second state, and the second state is different from the UP state. The first network device selects, based on the port status of the first port and the port status of the second port, a port to be switched to the UP state from the first port and the second port.

In this method, the port statuses of both sides are considered comprehensively. If a peer side port has entered a DOWN state or a delay state, a local side port should be kept in the UP state as much as possible. For example, after the local side port recovers from the DOWN state, the port should skip the delay state and directly enter the UP state. If the two ports enter the delay state at the same time, one port should exit from the delay state and enter the UP state. This prevents a situation in which the two ports that implement dual-homing access are not in the UP state at the same time, and prevents traffic interruption on the access side device as much as possible.

In a possible design, the first state is the DOWN state or a state of switching to the UP state after waiting for a first period of time, and the second state is the DOWN state or a state of switching to the UP state after waiting for a second period of time. A port whose port status is to switch to the UP state is the first port. The method further includes that a first network device switches the port status of the first port to the UP state. In this method, the port status of the first port skips the delay state or ends the delay state in advance, and enters the UP state, so that the situation in which the two ports that implement dual-homing access are not in the UP state at the same time is prevented, and traffic interruption on the access side device is prevented.

In a possible design, after the first network device switches the port status of the first port to the UP state, the method further includes that a first network device sends second information to the second network device, where the second information indicates that the port status of the first port is the UP state. The second network device obtains a latest port status of the first port, and the latest port status is used for reference in subsequent port status management.

In a possible design, the first information or the second information is included in a packet, and the packet is a Reciprocal Interface Status Advertisement Protocol (RI-SAP) packet, a Virtual Router Redundancy Protocol (VRRP) packet, or a multi-chassis link aggregation group (MC-LAG) packet.

In a possible design, the first state is a state of switching to the UP state after waiting for a first period of time, and the second state is a state of switching to the UP state after waiting for a second period of time. A port whose port status is to switch to the UP state is the second port. The method further includes that a first network device sends third information to the second network device, where the third information is used to indicate the second network device to switch the port status of the second port to the UP state. When the port statuses of both the first port and the second port are in the delay state, the access side device cannot connect to the network, but actually both the first port and the second port can switch to the UP state. In other words, in this case, it is unnecessary for the ports on both sides to be in the delay state at the same time. Therefore, the first network device needs to select one port from the first port and the second port and switches the port to the UP state, to ensure that the access side device connects to the network.

In a possible design, the access side device includes a third device, that the access side device communicates with a first port in the first network device includes that a third device communicates with the first port in the first network device. That the access side device communicates with a second port in the second network device includes that a third device communicates with the second port in the second network device. Alternatively, the access side device includes a third device and a fourth device. That the access side device communicates with a first port in the first network device includes that a third device communicates with the first port in the first network device, and that the access side device communicates with a second port in the second network device includes that a fourth device communicates with the second port in the second network device.

In a possible design, the first period of time or the second period of time is determined based on delayed port operation, delay negotiation of port trunk based on the LACP, or VRRP initialization UP delay.

According to a second aspect, this application provides a port status sending method, where the method is applied to a first network. The first network includes a first network device, a second network device, and an access side device. The access side device is dual-homed to the first network device and the second network device. The access side device communicates with a second port in the second network device. The method includes a second network device sending first information to the first network device, where the first information indicates that a port status of the second port is a second state, the second state is a state of switching to an UP state after waiting for a second period of time, and the UP state is a state in which a port can communicate with another network device. The second network device receives third information sent by the first network device. The second network device switches the port status of the second port to the UP state based on the third information.

In this method, when a local side port is in a delay state, a network device advertises a port status of the local side port to a peer network device, and switches the port status of the local side port to the UP state in advance based on an indication packet sent by the peer side. In this way, a situation in which the two ports that implement dual-homing access are not in the UP state at the same time is prevented, and traffic interruption on the access side device is prevented as much as possible.

In a possible design, the first information is included in a packet, and the packet is a RISAP packet, a VRRP packet, or a Multi MC-LAG packet.

In a possible design, the access side device includes a third device, that the access side device communicates with a first port in the first network device includes that a third device communicates with the first port in the first network device. That the access side device communicates with a second port in the second network device includes that a third device communicates with the second port in the second network device. Alternatively, the access side device includes a third device and a fourth device. That the access side device communicates with a first port in the first network device includes that a third device communicates with the first port in the first network device, and that the access side device communicates with a second port in the second network device includes that a fourth device communicates with the second port in the second network device.

In a possible design, the first period of time or the second period of time is determined based on delayed port operation, delay negotiation of port trunk based on the LACP, or VRRP initialization UP delay.

According to a third aspect, this application provides a network device, to perform the method in any one of the first aspect or the possible implementations of the first aspect. In an example, the network device includes units configured to perform the method in any one of the first aspect or the possible implementations of the first aspect.

According to a fourth aspect, this application provides a network device, to perform the method in any one of the second aspect or the possible implementations of the second aspect. In an example, the network device includes units configured to perform the method in any one of the second aspect or the possible implementations of the second aspect.

According to a fifth aspect, this application provides a network device. The network device includes a processor, a network interface, and a memory. The network interface may be a transceiver. The memory may be configured to store program code, and the processor is configured to invoke the program code in the memory to enable the network device to perform the method in any one of the first aspect or the possible implementations of the first aspect. Details are not described herein again.

According to a sixth aspect, this application provides a network device. The network device includes a processor, a network interface, and a memory. The network interface may be a transceiver. The memory may be configured to store program code, and the processor is configured to invoke the program code in the memory to enable the network device to perform the method in any one of the second aspect or the possible implementations of the second aspect. Details are not described herein again.

According to a seventh aspect, this application provides a network system. The network system includes the network device provided in the third aspect and the network device provided in the fourth aspect, or the network system includes the network device provided in the fifth aspect and the network device provided in the sixth aspect.

According to an eighth aspect, this application provides a computer-readable storage medium. The computer-readable storage medium stores instructions. When the instructions are run on a computer, the computer is enabled to perform the methods in the foregoing aspects.

According to a ninth aspect, this application provides a computer program product including computer program instructions. When the computer program product is run on a network device, the network device is enabled to perform the method provided in the first aspect, the second aspect, any possible implementation of the first aspect, or any possible implementation of the second aspect.

According to a tenth aspect, this application provides a chip, including a memory and a processor. The memory is configured to store a computer program, and the processor is configured to invoke the computer program from the memory and run the computer program, so that the chip performs the method according to any one of the first aspect and the possible implementations of the first aspect, or the processor is configured to invoke the computer program from the memory and run the computer program, so that the chip performs the method according to any one of the second aspect or the possible implementations of the second aspect.

Optionally, the chip includes only the processor, and the processor is configured to read and execute the computer program stored in the memory. When the computer program is executed, the chip performs the method according to any one of the first aspect or the possible implementations of the first aspect, or the chip performs the method according to any one of the second aspect or the possible implementations of the second aspect.

DESCRIPTION OF EMBODIMENTS

The following describes the embodiments of this application with reference to accompanying drawings.

Figure 1:
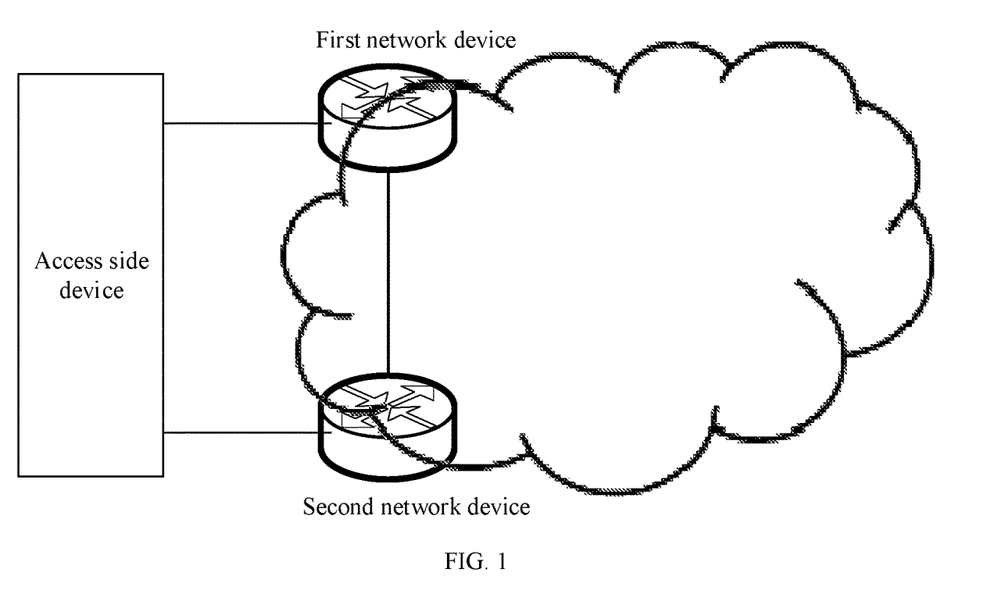
FIG. 1 is a schematic diagram of an application scenario according to an embodiment of this application.

FIG. 1 is a possible application scenario according to an embodiment of this application. This scenario includes a communications network, and the communications network includes an access side device, a first network device, and a second network device. The first network device and the second network device may be edge devices of the network, for example, a provider edge (PE) or a broadband access server (BAS). The access side may be user equipment, a switch, or an optical line terminal (OLT). The access side device is dual-homed to the first network device and the second network device, and is further connected to the network. When one network device in the first network device and the second network device cannot be connected, the access side device may connect to the network through the other network device, to ensure access reliability.

An implementation of dual-homing access may be access based on the VRRP, or may be access based on BAS hot backup redundancy user information (RUI), or may be a MC-LAG or an enhanced trunk (E-trunk), or may be BAS load-balancing cold backup access, or a customer premises equipment (CPE) dual-homing access router, or the like. In these implementations, there may be an active/standby relationship that is based on an active/standby protocol between the first network device and the second network device. The active/standby protocol may be the VRRP, a protocol for implementing the MC-LAG, or the like. Alternatively, there may not be the active/standby relationship that is based on the active/standby protocol between the first network device and the second network device. In this case, a routing protocol such as the Border Gateway Protocol (BGP), or a loop prevention protocol such as the Spanning Tree Protocol (STP) may be run on both the first network device and the second network device. The access side device may be one device dual-homed to the first network device and the second network device. The access side device may alternatively include a plurality of devices sequentially connected, where the first device connects to the first network device, and the last device connects to the second network device, so that the plurality of devices are dual-homed to the first network device and the second network device.

A port status includes an UP state and a DOWN state. The UP state is an operating state of a port. When the port is in the UP state, the port can communicate with another network device. The DOWN state is a non-operating state or a down state of the port. When the port is in the DOWN state, the port does not communicate with another network device. In a dual-homing access scenario, a delay policy is usually deployed on the first network device and the second network device. The delay policy may be UP delay of an access side port, delay negotiation of access side port trunk based on (LACP), UP delay of VRRP initialization, or the like. An example of the delay policy is that the port needs to wait for a preset period of time before switching from the DOWN state to the UP state. A length of the preset period of time may be set in a delay policy such as, for example, a delay policy of 180 seconds.

During the wait, the port does not communicate with another network device. For example, in a phase of port UP delay, although the port can physically receive optical signals, the port is still in the DOWN state. In a phase of trunk delay negotiation, although the port has a negotiation capability, the port does not perform negotiation, and a protocol layer is still in the DOWN state.

Figure 2:
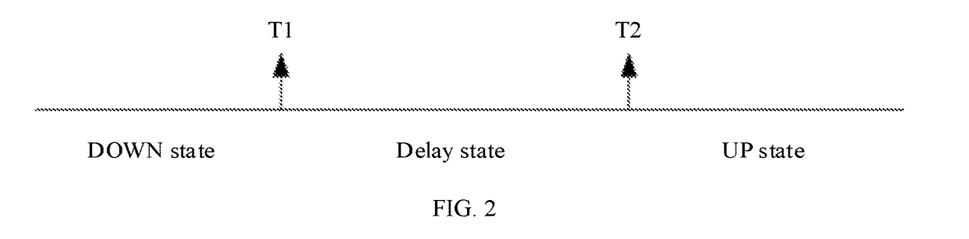
FIG. 2 is a schematic diagram of port statuses according to an embodiment of this application.

A third port state, that is, a delay state, is introduced through the delay policy. When the network device executes the delay policy, a port status of a related port in the network device may be referred to as the delay state, that is, switching to the UP state after waiting for a preset period of time. FIG. 2 shows the three states of the port status. Before a moment T1, the port status is the DOWN state. At the moment T1, the network device learns that the port can switch to the UP state. However, because of the delay policy, the network device needs to wait for the preset period of time, that is, a period from the moment T1 to a moment T2. Further, the port status switches to the UP state at the moment T2. Between the moment T1 and the moment T2, the port state is the delay state. Time between the moment T1 and the moment T2 is the foregoing preset waiting time, and a specific length is determined based on the delay policy. At the moment T2, the preset waiting time ends, the delay policy is completed, and the port status switches to the UP state. The delay state can prevent the system from being impacted by frequent intermittent disconnections of an access side link, or help to gain more time for recovery when a network side device restarts.

However, the delay state presents a problem of overprotection. Refer to the application scenario shown in FIG. 1. The access side device is connected to a first port in the first network device through a first link, the access side device is connected to a second port in the second network device through a second link, and the delay policy is deployed on both the two devices. For example, when the first port is in the DOWN state, the access side device communicates with the second port. In this case, the second link is intermittently disconnected and then quickly recovers. Because the delay policy is deployed on the second network device, the second port enters the delay state, that is, the second port needs to wait for the preset period of time before switching to the UP state. The preset period of time is determined based on the delay policy, for example, 180 seconds. In this case, neither the first network device nor the second network device is in the UP state within the 180 seconds. The access side device cannot connect to the network, and traffic is interrupted. It can be learned that, in this case, the delay state of the second port is overprotection. If the second port immediately switches from the DOWN state to the UP state, traffic interruption of the access side device can be avoided.

Figure 3:
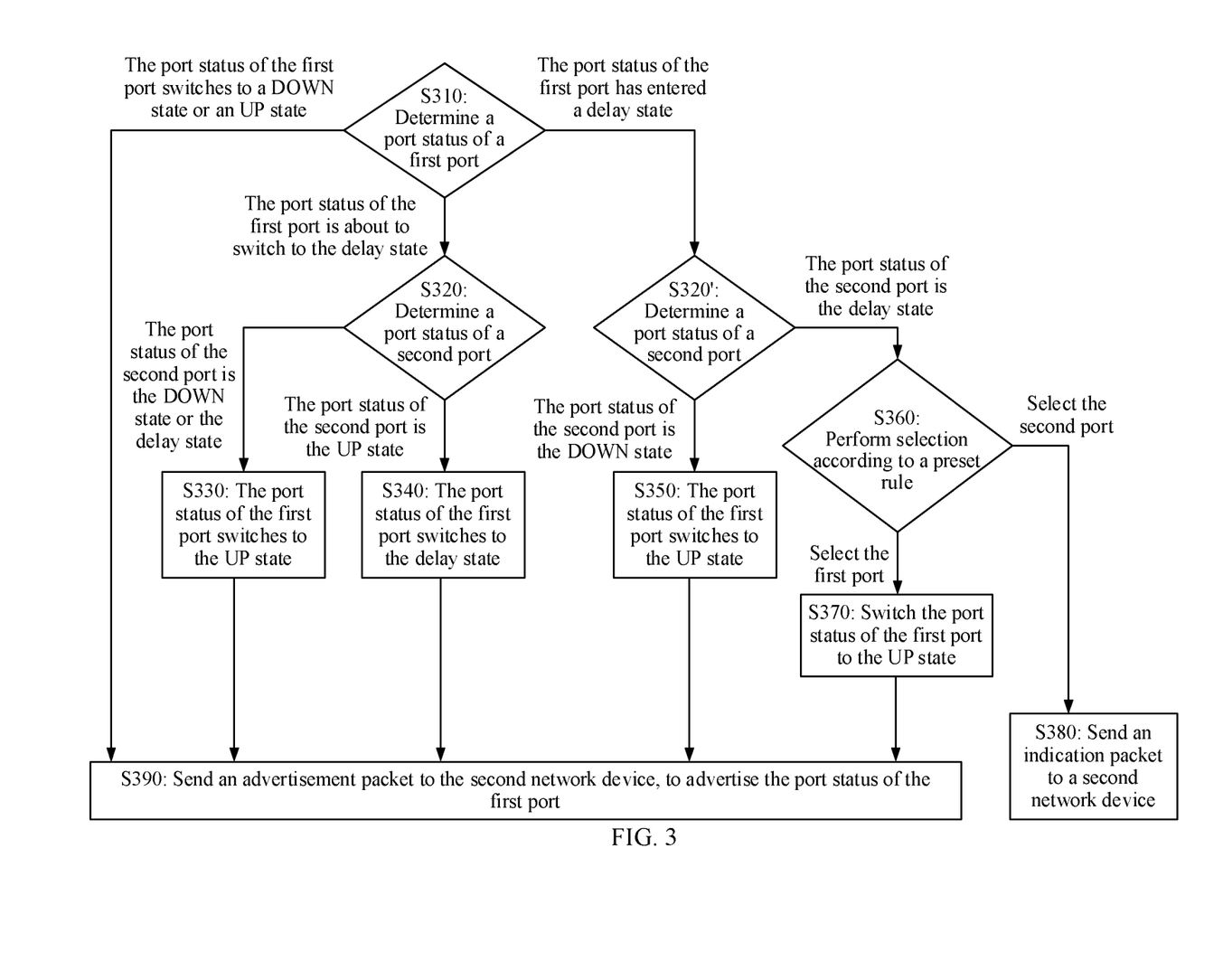
FIG. 3 is a schematic flowchart of a port selection method according to an embodiment of this application.

To resolve a technical problem of overprotection caused by the delay state, embodiments of the present application provide a port selection method, and a device and system based on the method. The embodiments of the method, the device, and the system may be mutually referenced, and similarities are not described again. FIG. 3 shows a flowchart of an implementation of the method. This method is applied to a communications network. Refer to the application scenario shown in FIG. 1. The network includes a first network device, a second network device, and an access side device. The access side device is dual-homed to the first network device and the second network device. The access side device communicates with a first port in the first network device. The access side device communicates with a second port in the second network device. In this method, port statuses of both sides are considered comprehensively. If a peer side port has entered a DOWN state or a delay state, a local side port should be kept in an UP state as much as possible. For example, after the local side port recovers from the DOWN state, the port should skip the delay state and directly enter the UP state. If the two ports enter the delay state at the same time, one port should exit from the delay state and enter the UP state. This prevents a situation in which the two ports that implement dual-homing access are not in the UP state at the same time, and prevents traffic interruption on the access side device as much as possible.

Refer to the port statuses shown in FIG. 2. The port statuses of both the first port and the second port may include three types, such as, the DOWN state, the delay state, or the UP state.

In the method, the first network device and the second network device may advertise the port statuses to each other. The first network device may advertise the port status of the first port to the second network device. The second network device may advertise the port status of the second port to the first network device.

Based on whether an active/standby protocol is deployed between the first network device and the second network device, types of protocols for advertising a port status are different. When the active/standby protocol is deployed between the first network device and the second network device, a packet of the active/standby protocol may be extended between the two devices to advertise and receive the port statuses. The active/standby protocol may be the VRRP or a protocol that implements MC-LAG. A neighbor relationship is established between the first network device and the second network device by using the foregoing protocol, and the active/standby protocol is set on the ports that implement dual-homing access in the two devices. In an example, the active/standby protocol is manually configured on the ports that implement dual-homing access in the two devices. After the neighbor relationship is established, the first network device and the second network device may bidirectionally send port status advertisement packets of the first port and the second port. When a port status of one of the first port and the second port changes, an advertisement packet of the changed port status may be sent unidirectionally. For example, when a port status of the second port changes, the second network device sends an advertisement packet to the first network device, to advertise a latest port status of the second port. Correspondingly, the first network device receives the advertisement packet, and records the port status of the second port.

Figure 4:
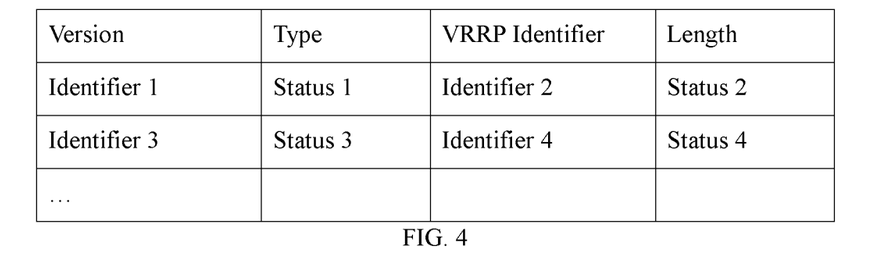
FIG. 4 is a schematic diagram of a format of a port status advertisement packet according to an embodiment of this application.

FIG. 4 shows a format of an extended port status advertisement packet when the active/standby protocol is the VRRP protocol. In FIG. 4, content of an IP packet header is omitted. That is, the packet format shown in FIG. 4 further includes the IP packet header at the front, to form a complete VRRP packet. A version field is used to indicate that the packet is a port status advertisement packet, and a value may be 2. A type field is used to indicate that a type of the VRRP packet is the port status advertisement packet, and a value may be 7. A VRRP identifier is used to identify a specific VRRP. A length field is used to indicate a quantity of port statuses in one advertisement packet. For example, a quantity of port statuses in the advertisement packet shown in FIG. 4 is 4. An identifier field is used to determine a specific port. In a first network device and a second network device, identifier fields of a pair of ports that implement dual-homing access are the same, that is, identifier fields of a first port and a second port are the same. A status field is used to indicate a port status. For example, the status field being 0 indicates an UP state, the status field being 1 indicates a DOWN state, the status field being 2 indicates a delay state, and the like.

When the active/standby protocol is of another type, for example, an MC-LAG, a format of the extended port status advertisement packet is similar to the format described above, and details are not described herein again.

When the active/standby protocol is not deployed between the first network device and the second network device, an extra protocol needs to be run between the two devices to advertise and receive the port status. The protocol may be the RISAP. In an example, the RISAP is established based on the Transmission Control Protocol (TCP), and a negotiation packet of the RISAP protocol is a TCP packet. A RISAP neighbor relationship is established after negotiation between the first network device and the second network device. The RISAP is bound on the ports that implement dual-homing access in the two devices. In an example, the active/standby protocol is manually configured on the ports that implement dual-homing access in the two devices. Source addresses and destination addresses used by RISAP neighbors may be loopback addresses of the devices. After the RISAP neighbor relationship is established, the first network device and the second network device may bidirectionally send port status advertisement packets of the first port and the second port. The advertisement packet may be a User Datagram Protocol (UDP) packet. When a port status of one of the first port and the second port changes, an advertisement packet of the changed port status may be sent unidirectionally. For example, when a port status of the second port changes, the second network device sends an advertisement packet to the first network device, to advertise a latest port status of the second port. Correspondingly, the first network device receives the advertisement packet, and records the port status of the second port.

Figure 5:
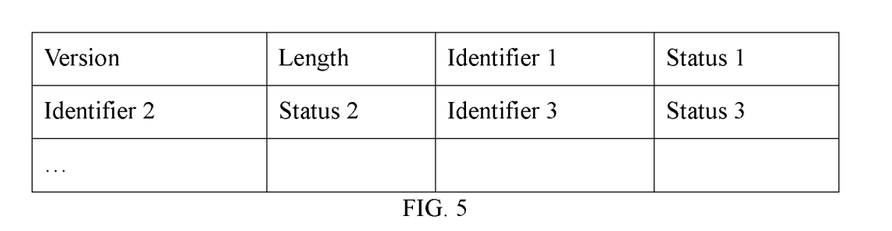
FIG. 5 is a schematic diagram of a format of a port status advertisement packet according to an embodiment of this application.

FIG. 5 shows a format of an advertisement packet when the RISAP is used. In FIG. 5, content of a UDP packet header is omitted. That is, the packet format shown in FIG. 5 further includes a UDP packet header at the front, to form a complete RISAP packet. A version field is used to indicate that the packet is a port status advertisement packet, and a value may be 1. A length field is used to indicate a quantity of port statuses in one advertisement packet. For example, a quantity of port statuses in the advertisement packet shown in FIG. 5 is 3. An identifier field is used to determine a specific port. In a first network device and a second network device, identifier fields of a pair of ports that implement dual-homing access are the same, that is, identifier fields of a first port and a second port are the same. A status field is used to indicate a port status. For example, the status field being 0 indicates an UP state, the status field being 1 indicates a DOWN state, the status field being 2 indicates a delay state, and the like.

In this method, a step of advertising a port status of a local side port by a network device to another network device and a step of receiving a port status of a peer side port are independent of each other, and may be performed at the same time or in any sequence.

Refer to the method flowchart shown in FIG. 3. The first network device performs S310 to determine a port status of the first port. In an example, the first network device may obtain the port status of the first port by using a port status management module in the device.

When the port status of the first port switches to the DOWN state or the UP state, the first network device performs S390 to send a port status advertisement packet to the second network device, to advertise the port status of the first port.

When the port status of the first port is about to be switched to the delay state, the first network device performs S320 to determine the port status of the second port. Refer to FIG. 2. At the moment T1, the first port is about to enter the delay state from the DOWN state. In this case, the first port has a capability to enter the UP state, that is, can switch to the UP state. After receiving an advertisement packet that is sent by the second network device and that is about the port status of the second port, the first network device records the port status of the second port, and further, the first network device determines the port status of the second port based on recorded content.

When the port status of the second port is the DOWN state or the delay state, the access side device needs to access the network through the first port. Therefore, the first network device performs S330 to switch the port status of the first port to the UP state. In an example, the port status of the first port directly switches from the DOWN state to the UP state, and the delay state is skipped. Refer to the port statuses shown in FIG. 2. In an example, the moment T1 coincides with the moment T2, and a time period between the moment T1 and the moment T2 does not exist. In an example, the situation in which the two ports that implement dual-homing access are not in the UP state at the same time is prevented, and traffic interruption on the access side device is prevented.

When the port status of the second port is the UP state, the access side device may access the network through the second port. In an example, the first network device performs S340 to switch the port status of the first port to the delay state. In other words, the first network device executes the delay policy, and the port status of the first port switches to the UP state after waiting for the preset period of time.

When the port status of the first port has entered the delay state, the first network device performs S320' to determine the port status of the second port. Refer to FIG. 2. Between the moment T1 and the moment T2, the port status of the first port enters the delay state. In an example, the first port can also switch to the UP state. A process of S320' is similar to a process of S320, and details are not described herein again.

When the port status of the second port is the DOWN state, the access side device needs to access the network through the first port. In an example, the first network device performs S350 to switch the port status of the first port to the UP state. In other words, the port status of the first port exits the delay state, and enters the UP state in advance, so that the situation in which the two ports that implement dual-homing access are not in the UP state at the same time is prevented, and traffic interruption on the access side device is prevented.

When the port status of the second port is also the delay state, both the first port and the second port are in the delay state. A reason why both the first port and the second port are in the delay state may be that a first link for connecting to the first port by the access side device and a second link for connecting to the second port by the access side device are intermittently disconnected at the same time and quickly recovered. In this case, both the first port and the second port enter the delay state. In addition, the first network device and the second network device respectively send advertisement packets used to advertise that the port enters the delay state to each other. When the port statuses of the first port and the second port each are the delay state, the access side device cannot connect to the network, but both the first port and the second port can switch to the UP state. In other words, in an example, it is unnecessary for the ports on both sides to be in the delay state at the same time. Therefore, the first network device needs to select one port from the first port and the second port and switches the port to the UP state, to ensure that the access side device connects to the network. A rule according to which the first network device selects the port to be switched to the UP state from the first port and the second port may be agreed upon in advance, and both the first network device and the second network device comply with the rule agreed upon in advance. Optionally, the rule may specify that a port in a network device whose source Internet Protocol (IP) address is larger exits the delay state. For example, a source IP address of the first network device is 10.1.1.2, and a source IP address of the second network device is 10.1.1.1. The first network device selects the first port as the port to be switched to the UP state.

When the first network device selects the first port as the port to be switched to the UP state, the first network device performs S370, that is, the first network device switches the port status of the first port to the UP state.

When the first network device selects the second port as the port to be switched to the UP state, the first network device performs S380. In an example, the first network device sends an indication packet to the second network device, and the indication packet is used to indicate the second network device to switch the port status of the second port to the UP state.

The second network device receives the indication information, and switches the port status of the second port to the UP state according to the indication information. In an example, the second network device may switch the port status of the second port to the UP state by using a port status management module in the device. Optionally, after the port status of the second port switches to the UP state, the second network device further sends a port status advertisement packet to the first network device, to advertise that the port status of the second port is the UP state.

In addition, after S330, S340, S350, and S370, the first network device performs S390. In an example, the first network device sends an advertisement packet to the second network device to advertise the port status of the first port. It is easy to understand that the second network device may also perform the method procedure shown in FIG. 3. When performing the method procedure, the second network device needs to determine the port status of the first port. A source of the port status of the first port may be the advertisement packet sent by the first network device in S390.

However, when the port status of the second port is the UP state, the access side device may access the network through the second port. Therefore, the port status of the first port may continue to be the delay state until the preset waiting time ends. That is, the first network device does not perform an operation, which is not shown in FIG. 3.

It should be noted that FIG. 3 shows an implementation procedure of the present application. In this embodiment of the present application, an execution sequence of the step of determining the port status of the first port by the first network device and the step of determining the port status of the second port by the first network device may be any sequence. That is, the first network device may first determine the port status of the first port and then determine the port status of the second port, or may first determine the port status of the second port and then determine the port status of the first port. Although FIG. 3 only shows the manner in which the first network device may first determine the port status of the first port and then determine the port status of the second port, a manner in which the first network device first determines the port status of the second port and then determines the port status of the first port is a normal adjustment. A person skilled in the art can easily obtain a specific implementation of the manner, and details are not described herein again.

Figure 6:
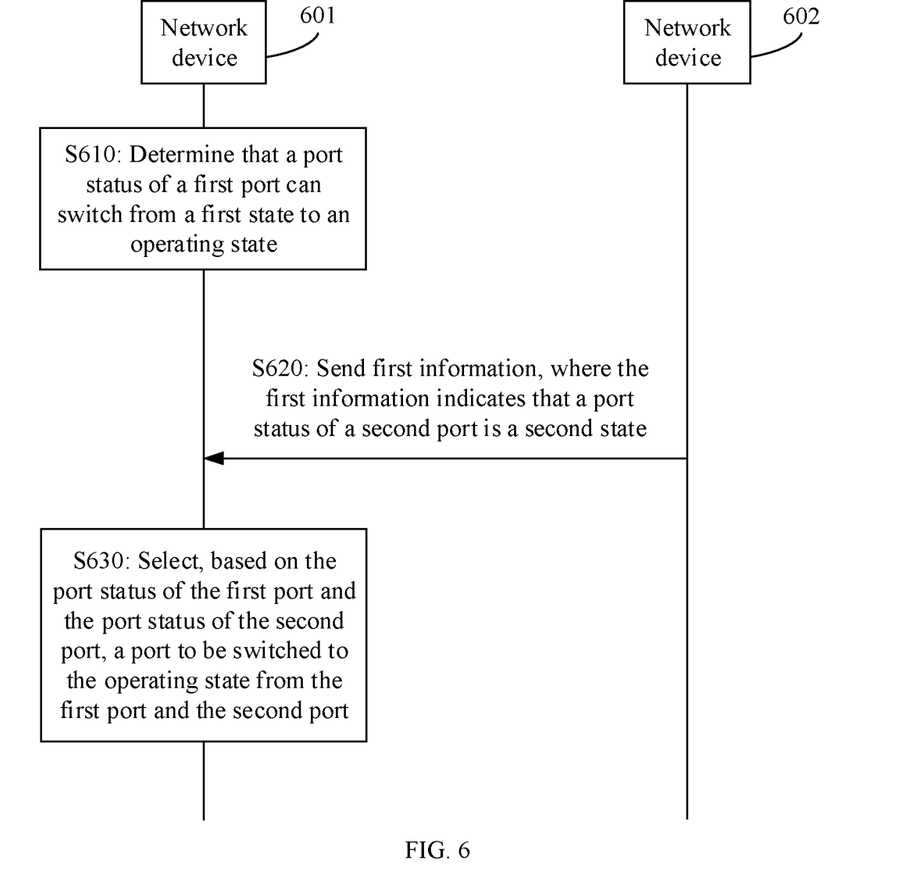
FIG. 6 is a schematic flowchart of a port selection method according to an embodiment of this application.

FIG. 6 shows a procedure of a port selection method provided in the present application. The method is applied to a communications network. The network includes a network device 601, a network device 602, and an access side device. The access side device is dual-homed to the network device 601 and the network device 602. The access side device communicates with a first port in the network device 601, and communicates with a second port in the network device 602. Refer to the application scenario shown in FIG. 1. The network device 601 may be the first network device, and the network device 602 may be the second network device. The method may include the following steps.

S610: The network device 601 determines that a port status of the first port can switch from a first state to an UP state. The first state is different from the UP state. The UP state is a state in which a port can communicate with another network device.

In this embodiment of the present application, the network device 601 needs to determine a port status of a local side port used for dual-homing access, that is, the first port. Refer to FIG. 2. The port status of the first port may include three types such as the DOWN state, the delay state, or the UP state. When the first port is about to enter the delay state from the DOWN state, that is, at the moment T1, the first port has a capability to enter the UP state, that is, can switch to the UP state. After entering the delay state, that is, between the moment T1 and the moment T2, the first port can also switch to the UP state. Therefore, when in the foregoing periods of time, the network device 601 may determine that the port status of the first port can switch from the first state to the UP state. In an example, the network device 601 may obtain the port status by using an interface status management module in the device, and learn that the first port is about to enter the delay state or has entered the delay state, in other words, the first port is at the moment T1 or between the moment T1 and the moment T2 shown in FIG. 2. Then the network device 601 determines that the port status of the first port can switch from the first state to the UP state.

S620: The network device 602 sends first information to the network device 601. The first information indicates that a port status of the second port is a second state. The second state is different from the UP state.

The first information may be the port status advertisement packet described above. Based on whether an active/standby protocol is deployed between the network device 601 and the network device 602, types of the advertisement packet are different. For details, refer to the foregoing description of the advertisement packet. Details are not described herein again.

Refer to FIG. 2. The port status of the second port may also include three types such as the DOWN state, the delay state, or the UP state. Optionally, the port status of the second port is not the UP state, for example, is the DOWN state or the delay state. In this case, when switching the port status of the first port, the network device 601 needs to consider the port status of the second port, so as to avoid traffic interruption on the access side device caused by the two ports not being in the UP state at the same time.

A sequence in which the network device determines the port status of the local side port and obtains a port status of a peer side port is not limited in this embodiment of the present application, that is, an execution sequence of S620 and S610 is not limited. S610 may be performed before S620, or S620 may be performed before S610.

S630: The first network device 601 selects, based on the port status of the first port and the port status of the second port, a port to be switched to the UP state from the first port and the second port.

According to the foregoing description, the network device 601 and the network device 602 advertise the port status to each other, so that the network device 601 and the network device 602 can learn both the port status of the local side port and the port status of the peer side port. On such basis, the port statuses of both sides need to be considered comprehensively. If the peer side port has entered the DOWN state or the delay state, the local side port should be kept in the UP state as much as possible. For example, after the local side port recovers from the DOWN state, the port should skip the delay state and directly enter the UP state. If the ports of both sides enter the delay state at the same time, one port should exit from the delay state and enter the UP state, to prevent a situation in which the two ports that implement dual-homing access are not in the UP state at the same time, and prevent traffic interruption on the access side device as much as possible.

An example of a rule for selecting the port to be switched to the UP state may be as following.

If the port status of the first port is that the first port is about to enter the delay state, and the port status of the second port is the DOWN state or the delay state, select the first port as the port to be switched to the UP state.

If the port status of the first port is that the first port has entered the delay state, and the port status of the second port is the DOWN state, select the first port as the port to be switched to the UP state.

If the port status of the first port is that the first port has entered the delay state, and the port status of the second port is that the second port has entered the delay state, further selection is performed according to a preset rule. When a port that meets the preset rule is the first port, select the first port as the port to be switched to the UP state. When the port that meets the preset rule is the second port, select the second port as the port to be switched to the UP state.

For example, the preset rule specifies that a port in a network device whose source IP address is larger exits the delay state. For another example, the preset rule specifies that a port in a network device whose source IP address is smaller exits the delay state.

When the first port is selected as the port to be switched to the UP state, the network device 601 further performs 5641. The network device 601 switches the port status of the first port to the UP state, which is not shown in FIG. 6.

In an example, the network device 601 may switch the port status of the first port to the UP state by using the port status management module in the device.

Optionally, after the port status of the first port switches to the UP state, the network device 601 further performs 5642. The network device 601 sends a port status advertisement packet to the network device 602, where the advertisement packet is used to advertise that the port status of the first port is the UP state. This is not shown in FIG. 6. For details, refer to the foregoing description of the advertisement packet. Details are not described herein again.

When the second port is selected as the port to be switched to the UP state, the network device 601 further performs 5650. The network device 601 sends indication information to the network device 602, where the indication information is used to indicate the network device 602 to switch the port status of the second port to the UP state.

The network device 602 receives the indication information, and switches the port status of the second port to the UP state according to the indication information. In an example, the network device 602 may switch the port status of the second port to the UP state by using a port status management module in the device. Optionally, after the port status of the second port switches to the UP state, the network device 602 further sends a port status advertisement packet to the network device 601, to advertise that the port status of the second port is the UP state.

Figure 7:
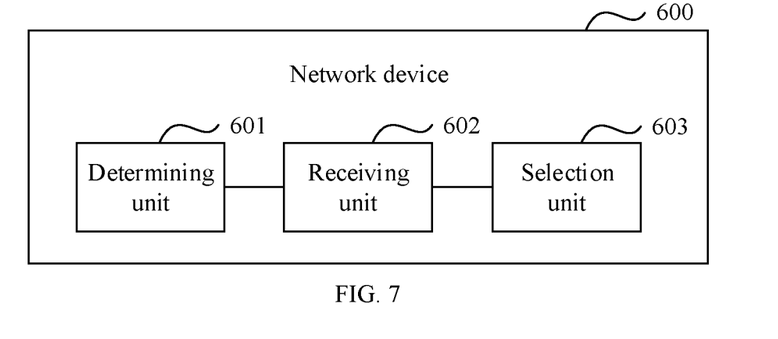
FIG. 7 is a schematic diagram of a structure of a network device according to an embodiment of this application.

FIG. 7 is a schematic diagram of a possible structure of the network device in the foregoing embodiments. A network device 600 may implement a function of the first network device in the embodiment shown in FIG. 3 or a function of the network device 601 in the embodiment shown in FIG. 6. Refer to FIG. 7. The network device 600 includes a determining unit 601, a receiving unit 602, and a selection unit 603. These units may perform corresponding functions of the first network device in the embodiment shown in FIG. 3 or corresponding functions of the network device 601 in the embodiment shown in FIG. 6. For example, The network device 600 is a first network device. The first network device is in a first network, where the first network includes the first network device, a second network device, and an access side device. The access side device is dual-homed to the first network device and the second network device. The access side device communicates with a first port in the first network device, and communicates with a second port in the second network device.

The determining unit 601 is configured to determine that a port status of the first port can switch from a first state to an UP state, where the first state is different from the UP state, and the UP state is a state in which a port can communicate with another network device.

The receiving unit 602 is configured to receive first information sent by the second network device, where the first information indicates that a port status of the second port is a second state, and the second state is different from the UP state.

The selection unit 603 is configured to select, based on the port status of the first port and the port status of the second port, a port to be switched to the UP state from the first port and the second port.

Figure 8:
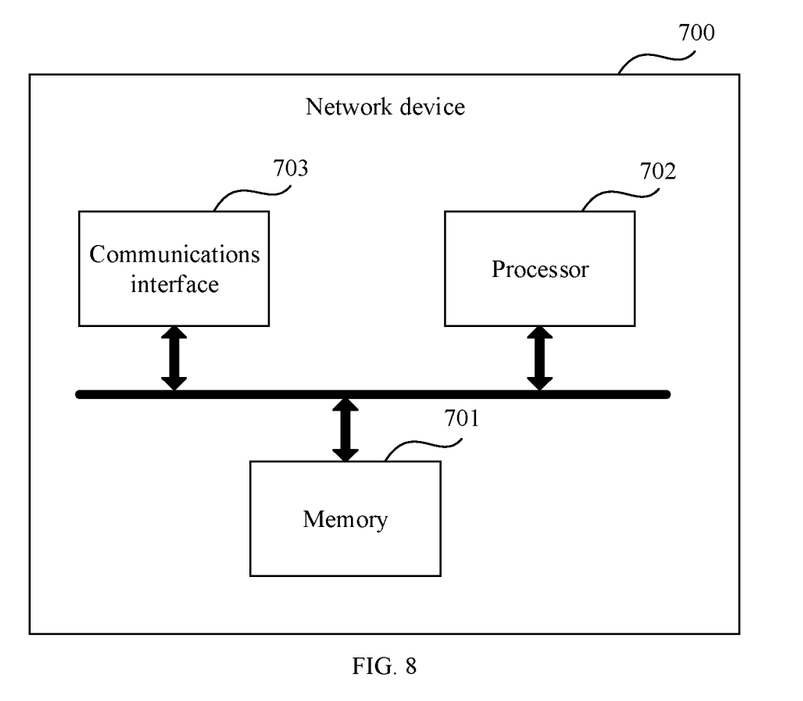
FIG. 8 is a schematic diagram of a structure of a network device according to an embodiment of this application.

FIG. 8 is another schematic diagram of a possible structure of the first network device in the foregoing embodiment shown in FIG. 3 or the network device 601 in the embodiment shown in FIG. 6. Refer to FIG. 8. A network device 700 includes a processor 702, a network interface 703, and a memory 701.

The memory 701 is configured to store instructions. When the embodiment shown in FIG. 6 is implemented and the units described in the embodiment in FIG. 6 are implemented by using software, software or program code required for performing functions of the units in FIG. 6 is stored in the memory 701.

The processor 702 is configured to execute the instructions in the memory 701, so as to perform the foregoing port selection method applied to the embodiment shown in FIG. 3 or FIG. 6.

The network interface 703 is configured to communicate with another network device.

The network interface 703, the processor 702, and the memory 701 are connected to each other. For example, the network interface 703, the processor 702, and the memory 701 are connected to each other through a bus. The bus may be a Peripheral Component Interconnect (PCI) bus, an Extended Industry Standard Architecture (EISA) bus, or the like. The bus may be classified into an address bus, a data bus, a control bus, or the like. For ease of representation, only one thick line is used to represent the bus in FIG. 8, but this does not mean that there is only one bus or only one type of bus.

In an embodiment, the processor 702 is configured to determine that a port status of the first port can switch from a first state to an UP state, where the first state is different from the UP state, and the UP state is a state in which a port can communicate with another network device; receive first information sent by the second network device, where the first information indicates that a port status of the second port is a second state, and the second state is different from the UP state; and select, based on the port status of the first port and the port status of the second port, the port to be switched to the UP state from the first port and the second port. For a detailed processing process of the processor 702, refer to the detailed description of S310, S320, S320', S330, S350, S360, S370, S380, and S390 in the process in the foregoing embodiment shown in FIG. 3, or the detailed description of S610 and S630 in the process in the embodiment shown in FIG. 6. Details are not described herein again.

The network interface 703 is used by the network device 700 to receive and send a packet by using a network system. For an example process, refer to the detailed description of S310, S320, S320', S380, and S390 in the foregoing embodiment shown in FIG. 3, or the detailed description of S610 in the embodiment shown in FIG. 6. Details are not described herein again.

Figure 9:
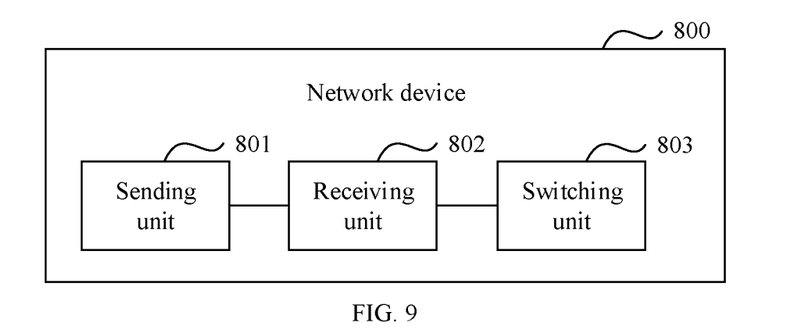
FIG. 9 is a schematic diagram of a structure of a network device according to an embodiment of this application.

FIG. 9 is a schematic diagram of a possible structure of the network device in the foregoing embodiments. A network device 800 may implement a function of the second network device in the embodiment shown in FIG. 3 or a function of the network device 602 in the embodiment shown in FIG. 6. Refer to FIG. 9. The network device 800 includes a sending unit 801, a receiving unit 802, and a switching unit 803. These units may perform corresponding functions of the network device in the foregoing method embodiment. For example, The network device 800 is a second network device. The second network device is in a first network. The first network includes a first network device, the second network device, and an access side device. The access side device is dual-homed to the first network device and the second network device. The access side device communicates with a first port in the first network device, and communicates with a second port in the second network device.

The sending unit 801 is configured to send first information to the first network device, where the first information indicates that a port status of the second port is a second state. The second state is a state of switching to an UP state after waiting for a second period of time, and the UP state is a state in which a port can communicate with another network device.

The receiving unit 802 is configured to receive third information sent by the first network device.

The switching unit 803 is configured to switch the port status of the second port to the UP state based on the third information.

Figure 10:
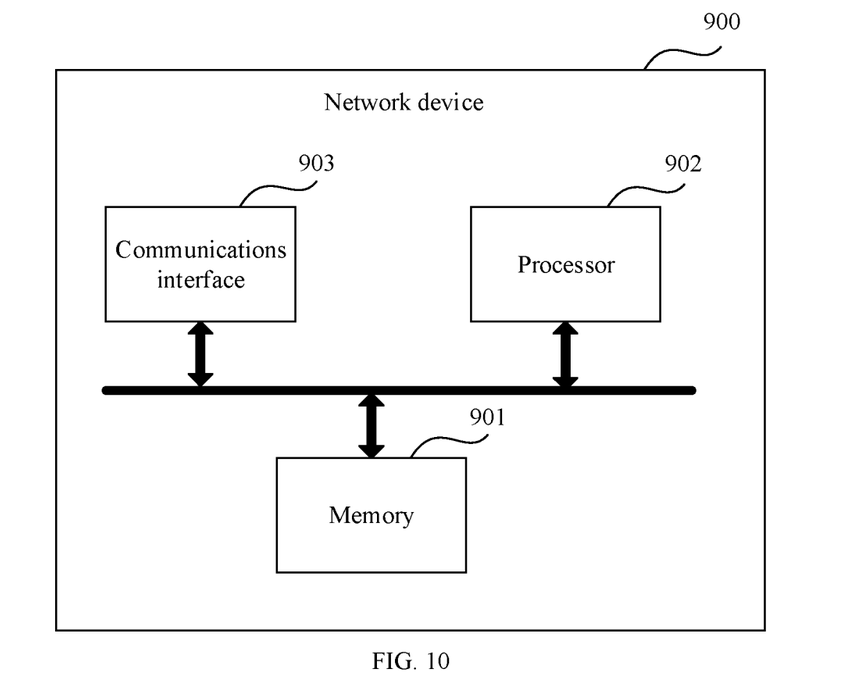
FIG. 10 is a schematic diagram of a structure of a network device according to an embodiment of this application.

FIG. 10 is a schematic diagram of a possible structure of the second network device in the foregoing embodiment shown in FIG. 3 or the network device 602 in the embodiment shown in FIG. 6. A network device 900 includes a processor 902, a network interface 903, and a memory 901.

The memory 901 is configured to store instructions. When the embodiment shown in FIG. 8 is implemented and the units described in the embodiment in FIG. 8 are implemented by using software, software or program code required for performing functions of the units in FIG. 8 is stored in the memory 901.

The processor 902 is configured to execute the instructions in the memory 901, to perform the foregoing port status sending method applied to the embodiment shown in FIG. 3 or FIG. 6.

The network interface 903 is configured to communicate with another network device.

The network interface 903, the processor 902, and the memory 901 are connected to each other. For example, the network interface 903, the processor 902, and the memory 901 are connected to each other through a bus. The bus may be a PCI bus, an EISA bus, or the like. The bus may be classified into an address bus, a data bus, a control bus, and the like. For ease of representation, only one bold line is used in FIG. 10 to represent the bus, but it does not indicate that there is only one bus or one type of bus.

In an embodiment, the processor 902 is configured to send first information to the first network device, where the first information indicates that a port status of the second port is a second state, the second state is a state of switching to an UP state after waiting for a second period of time, and the UP state is a state in which a port can communicate with another network device; receive third information sent by the first network device; and switch the port status of the second port to the UP state based on the third information. For a detailed processing process of the processor 902, refer to the detailed description of S320, S320', and S380 in the process in the foregoing embodiment shown in FIG. 3, or the detailed description of S620 and S630 in the process in the embodiment shown in FIG. 6. Details are not described herein again.

The network interface 903 is used by the network device 900 to send and receive a packet by using a network system. For an example process, refer to the detailed description of S320, S320', and S380 in the foregoing embodiment shown in FIG. 3, or the detailed description of S620 and S630 in the embodiment shown in FIG. 6. Details are not described herein again.

The memory 701 and the memory 901 may be a random access memory (RAM), flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other forms of storage medium known to a person skilled in the art.

The processor 702 and the processor 902 may be, for example, a central processing unit (CPU), a general-purpose processor, a digital signal processor (DSP), a field-programmable gate array (FPGA), or other programmable logical devices, transistor logical devices, hardware components, or any combinations thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

Each of the network interface 703 and the network interface 903 may be, for example, an interface card, and may be an Ethernet interface or an asynchronous transfer mode (ATM) interface. The network interface 703 and the network interface 903 may be wired interfaces or wireless interfaces.

The processor 702 and the processor 902 may be, for example, application-specific integrated circuits (ASIC). In this case, the processor 702 and the processor 902 perform, based on their own circuits, the foregoing packet processing method applied to the embodiment shown in FIG. 3. In other words, in this case, the memory 701 and the memory 901 do not need to store the instructions executed by the processor 702 and the processor 902, and the processor 702 and the processor 902 no longer execute the instructions in the memory 701 and the memory 901. Optionally, in this case, the network device may not include the memory 701 or the memory 901.

Figure 11:
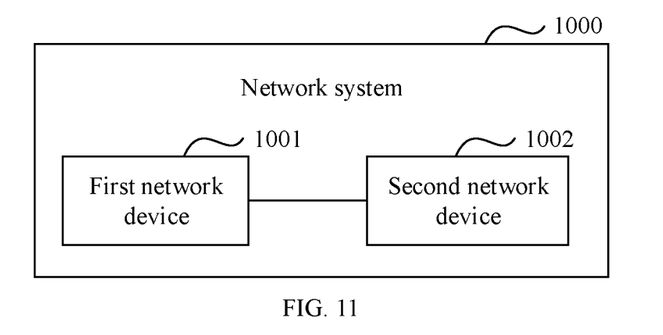
FIG. 11 is a schematic diagram of a structure of a network system according to an embodiment of this application.

Refer to FIG. 11. FIG. 11 is a schematic diagram of a possible structure of a network system according to an embodiment of the present application. The network system 1000 includes a first network device 1001 and a second network device 1002. The first network device 1001 in the network system may perform the processing steps of the first network device in the embodiment shown in FIG. 3 or the processing steps of the network device 601 in the embodiment shown in FIG. 6. The second network device 1002 in the network system may perform the processing steps of the second network device in the embodiment shown in FIG. 3 or the processing steps of the network device 602 in the embodiment shown in FIG. 6. Correspondingly, the first network device 1001 in the network system may be the network device 600 in the embodiment shown in FIG. 7, and the second network device 1002 may be the network device 800 in the embodiment shown in FIG. 9. Alternatively, correspondingly, the first network device 1001 in the network system may be the network device 700 in the embodiment shown in FIG. 8, and the second network device 1002 may be the network device 900 in the embodiment shown in FIG. 10.

In an example, the first network device is configured to determine that a port status of a first port can switch from a first state to an UP state, where the first state is different from the UP state, and the UP state is a state in which a port can communicate with another network device; receive first information sent by the second network device, where the first information indicates that a port status of a second port is a second state, and the second state is different from the UP state; and select, based on the port status of the first port and the port status of the second port, a port to be switched to the UP state from the first port and the second port.

The second network device is configured to send the first information to the first network device, where the first information indicates that the port status of the second port is the second state, the second state is a state of switching to the UP state after waiting for a second period of time, and the UP state is the state in which a port can communicate with another network device; receive third information sent by the first network device; and switch the port status of the second port to the UP state based on the third information.

An embodiment of the present application further provides a non-transient storage medium configured to store software instructions used in the foregoing embodiment. The non-transient storage medium includes a program used to perform the methods shown in the foregoing embodiment. When the program is executed on a computer or a network device, the computer or the network device is enabled to perform the method in the foregoing method embodiment.

An embodiment of the present application further provides a computer program product including computer program instructions. When the computer program product is run on a computer, a network node is enabled to perform the method in the foregoing method embodiment.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way is interchangeable in proper circumstances so that embodiments of the present application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical service division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, services described in the present application may be implemented by hardware, software, firmware, or any combination thereof. When the services are implemented by software, the services may be stored in a computer-readable medium or transmission of the services may be performed by using the services as one or more instructions or code in the computer-readable medium. The computer-readable medium includes a computer storage medium and a communications medium, where the communications medium includes any medium that facilitates transmission of a computer program from one place to another. The storage medium may be any available medium accessible to a general-purpose or dedicated computer.

The objectives, technical solutions, and beneficial effects of the present application have been described in further detail in the foregoing implementations. It should be understood that the foregoing description are implementations of the present application.

The foregoing embodiments are intended to describe the technical solutions of this application, but are not to limit this application. Although this application is described with reference to the foregoing embodiments, a person of ordinary skill in the art should understand that modifications may still be made to the technical solutions recorded in the foregoing embodiments or make equivalent replacements to some technical features thereof, without departing from the scope of the technical solutions of embodiments of this application.

What is claimed is:

1. A port selection method implemented by a first network device and comprising:
   determining whether a first port status of a first port in a first network device is switchable from a first state to an UP state, wherein the first state is different from the UP state, and wherein the UP state is a state in which a port is able to communicate with another network device;
   receiving first information from a second network device, wherein the first information indicates that a second port status of a second port in the second network device is a second state, and wherein the second state is different from the UP state; and switching, based on the first port status and the second port status, a third port status of a port from either the first port or the second port according to a delay policy, wherein the third port status indicates the UP state, wherein the delay policy comprises skipping a delay state of a port from either the first port or the second port when another port from either the first port or the second port is in the delay state, and wherein the delay state is a state of switching to the UP state after waiting for a preset period of time.

2. The port selection method of claim 1, wherein the first state is a DOWN state or a state of switching to the UP state after waiting for a first period of time, wherein the second state is the DOWN state or a state of switching to the UP state after waiting for a second period of time, wherein a port whose port status is to switch to the UP state is the first port, and wherein the port selection method further comprises switching the first port status to the UP state.

3. The port selection method of claim 2, further comprising determining the first period of time or the second period of time based on delayed port operation, delay negotiation of port trunk based on a Link Aggregation Control Protocol (LACP), or operation delay of Virtual Router Redundancy Protocol (VRRP) initialization.

4. The port selection method of claim 2, wherein after switching the first port status to the UP state, the port selection method further comprises sending, device, second information to the second network device, wherein the second information indicates that the first port status of the first port is the UP state.

5. The port selection method of claim 4, wherein the first information or the second information is comprised in a packet, and wherein the packet is a Reciprocal Interface Status Advertisement Protocol (RISAP) packet, a Virtual Router Redundancy Protocol (VRRP) packet, or a multi-chassis link aggregation group (MC-LAG) packet.

6. The port selection method of claim 1, wherein the first state is a state of switching to the UP state after waiting for a first period of time, wherein the second state is a state of switching to the UP state after waiting for a second period of time, wherein a port whose port status is to switch to the UP state is the second port, wherein the port selection method further comprises sending third information to the second network device, wherein the third information instructs the second network device to switch the second port status to the UP state.

7. The port selection method of claim 1, wherein when an access side device comprises either a third device or a third device and a fourth device, the port selection method comprises communication with the third device via the first port.

8. A first network device in a network and comprising:
a first port;
a memory configured to store programming instructions; and
one or more processors coupled to the memory, wherein the programming instructions when executed by the one or more processors cause the first network device to be configured to:
determine whether a first port status of the first port switchable from a first state to an UP state, wherein the first state is different from the UP state, and wherein the UP state is a state in which a port is able to communicate with another network device;
receive first information from a second network device in the network, wherein the first information indicates that a second port status of a second port in the second network device is a second state, and wherein the second state is different from the UP state; and switch, based on the first port status and the second port status, a third port status of a port from either the first port or the second port according to a delay policy, wherein the third port status indicates the UP state, wherein the delay policy comprises skipping a delay state of a port from either the first port or the second port when another port from either the first port or the second port is in the delay state, and wherein the delay state is a state of switching to the UP state after waiting for a preset period of time.

9. The network device of claim 8, wherein the first state is a DOWN state or a state of switching to the UP state after waiting for a first period of time, wherein the second state is the DOWN state or a state of switching to the UP state after waiting for a second period of time, wherein a port whose port status is to switch to the UP state is the first port, and wherein the programming instructions further cause the first network device to be configured to switch the first port status to the UP state.

10. The network device of claim 9, wherein the programming instructions further cause the first network device to be configured to send second information to the second network device, wherein the second information indicates that the first port status is the UP state.

11. The network device of claim 8, wherein the first state is in a third state of switching to the UP state after waiting for a first period of time, wherein the second state is in a fourth state of switching to the UP state after waiting for a second period of time, wherein a port whose port status is to switch to the UP state is the first port, wherein the programming instructions further cause the first network device to be configured to switch the first port status to the UP state.

12. The network device of claim 8, wherein the first state is in a third state of switching to the UP state after waiting for a first period of time, wherein the second state is in a fourth state of switching to the UP state after waiting for a second period of time, wherein a port whose port status is to switch to the UP state is the second port, wherein the programming instructions further cause the first network device to be configured to send third information to the second network device, wherein the third information instructs the second network device to switch the second port status to the UP state.

13. The network device of claim 12, wherein the programming instructions further cause the first network device to be configured to determine the first period of time or the second period of time based on delayed port operation, delay negotiation of port trunk based on a Link Aggregation Control Protocol (LACP), or operation delay of Virtual Router Redundancy Protocol (VRRP) initialization.

14. A network system, comprising:
a second network device comprising a second port and configured to send first information indicating that a second port status of the second port is a second state, wherein the second state is different from an UP state;
a first network device coupled to the second network device and comprising a first port and configured to:
determine whether a first port status of the first port is switchable from a first state to an UP state, wherein the first network device comprises the first port, wherein the first state is different from the UP state, and wherein the UP state is a state in which a port can communicate with another network device;

receive the first information from the second network device; and switch, based on the first port status and the second port status, a third port status of a port from either the first port or the second port according to a delay policy, wherein the third port status indicates the UP state,. wherein the delay policy comprises skipping a delay state of a port from either the first port or the second port when another port from either the first port or the second port is in the delay state, and wherein the delay state is a state of switching to the UP state after waiting for a preset period of time; and an access side device coupled to the first network device and the second network device and configured to:

be dual-homed to the first network device and the second network device; and communicate with the first network device and with the second network device.

15. The network system of claim 14, wherein the first state is a DOWN state or a state of switching to the UP state after waiting for a first period of time, wherein the second state is the DOWN state or a state of switching to the UP state after waiting for a second period of time, wherein a port whose port status is to switch to the UP state is the first port, and wherein the first network device is further configured to switch the first port status to the UP state.

16. The network system of claim 15, wherein the first network device is further configured to send second information to the second network device, and wherein the second information indicates that the first port status is the UP state.

17. The network system of claim 16, wherein the first information or the second information is located in a packet, and wherein the packet is a Reciprocal Interface Status Advertisement Protocol (RISAP) packet, a Virtual Router Redundancy Protocol (VRRP) packet, or a multi-chassis link aggregation group (MC-LAG) packet.

18. The network system of claim 15, wherein the first network device is configured to determine the first period of time or the second period of time based on delayed port operation, delay negotiation of port trunk based on a Link Aggregation Control Protocol (LCAP), or operation delay of Virtual Router Redundancy Protocol (VRRP) initialization.

19. The network system of claim 14, wherein the first state is a state of switching to the UP state after waiting for a first period of time, wherein the second state is a state of switching to the UP state after waiting for a second period of time, wherein a port whose port status is to switch to the UP state is the second port, and wherein the first network device is further configured to send third information to the second network device, wherein the third information instructs the second network device to switch the second port status to the UP state.

20. The network system of claim 14, further comprising: wherein when the access side device comprises a third device, the access side device is configured to communicate with the first network device by:

communicating, by the third device, with the first port in the first network device; and communicating, by the third device, with the second port in the second network device; or wherein when the access side device comprises a third device and a fourth device, the access side device is configured to communicate with the first network device by:

communicating, by the third device, with the first port; and communicating, by the fourth device, with the second port.

* * * * *

UNITED STATES PATENT AND TRADEMARK OFFICE
CERTIFICATE OF CORRECTION

PATENT NO.       : 11,882,059 B2
APPLICATION NO.  : 17/731927
DATED            : January 23, 2024
INVENTOR(S)      : Yaokun Zhang and Boran Fan It is certified that error appears in the above-identified patent and that said Letters Patent is hereby corrected as shown below:

In the Claims

Claim 4, Column 19, Line 29: "selection method further comprises sending, device, second" should read "selection method further comprises sending second"

Claim 8, Column 19, Line 62: "switchable from a first state to an UP state, wherein" should read "is switchable from a first state to an UP state, wherein"

Claim 14, Column 21, Line 6: "wherein the third port status indicates the UP state,." should read "wherein the third port status indicates the UP state,"

Claim 20, Column 22, Line 19: "The network system of claim 14, further comprising:" should read "The network system of claim 14,"

Signed and Sealed this
Nineteenth Day of March, 2024

Katherine Kelly Vidal
*Director of the United States Patent and Trademark Office*